(12) United States Patent
Zhao et al.

(10) Patent No.: US 11,560,980 B2
(45) Date of Patent: Jan. 24, 2023

(54) GREASE PUMPING DEVICE

(71) Applicant: ZHENGZHOU AUTOL TECHNOLOGY CO., LTD., Henan (CN)

(72) Inventors: Daping Zhao, Henan (CN); Xingong Liu, Henan (CN); Zhang Liu, Henan (CN); Lifeng Ma, Henan (CN)

(73) Assignee: ZHENGZHOU AUTOL TECHNOLOGY CO., LTD., Henan (CN)

( * ) Notice: Subject to any disclaimer, the term of this patent is extended or adjusted under 35 U.S.C. 154(b) by 463 days.

(21) Appl. No.: 16/857,204

(22) Filed: Apr. 24, 2020

(65) Prior Publication Data

US 2020/0248868 A1  Aug. 6, 2020

Related U.S. Application Data

(63) Continuation-in-part of application No. PCT/CN2018/108859, filed on Sep. 29, 2018.

(30) Foreign Application Priority Data

Oct. 25, 2017 (CN) .......................... 201711016253.8

(51) Int. Cl.
*F16N 13/10* (2006.01)
*F16N 23/00* (2006.01)

(52) U.S. Cl.
CPC ............. *F16N 13/10* (2013.01); *F16N 23/00* (2013.01)

(58) Field of Classification Search
CPC .......... F16N 13/10; F16N 23/00; F16N 11/08; F16N 13/02; F16K 31/523
(Continued)

(56) References Cited

U.S. PATENT DOCUMENTS 2,732,916 A * 1/1956 Deakin ................... F16N 27/00
                                                    184/14
5,165,502 A  11/1992 Hirose et al.
2015/0184773 A1* 7/2015 Hermann .......... F16K 31/52483
                                                    251/251

FOREIGN PATENT DOCUMENTS

CN          1467402       1/2004
CN          102313126     1/2012
(Continued)

OTHER PUBLICATIONS

"Search Report of Europe Counterpart Application", dated May 7, 2021, p. 1-p. 8.
(Continued)

*Primary Examiner* — Michael R Mansen
*Assistant Examiner* — Mark K Buse
(74) *Attorney, Agent, or Firm* — JCIP Global Inc.

(57) ABSTRACT

A grease pumping device includes a pump body, a driving mechanism, a plunger pair, a reversing valve and a lever mechanism. A switching action between each valve position of a valve core of the reversing valve is driven by the lever mechanism. An output rotating shaft drives a toggle member rotating therewith, and when the output rotating shaft rotates reciprocally in forward and reverse directions, the toggle member toggles the lever mechanism in the forward and reverse directions, such that the lever mechanism swings reciprocally. At least one of the lever mechanism and the toggle member is an elastic structure, when the output rotating shaft rotates, the toggle member contacts the lever mechanism and drives the valve core to operate, when the valve core is switched to a corresponding valve position, the toggle member and the lever mechanism slide relatively by elastic deformation of the elastic structure.

20 Claims, 17 Drawing Sheets

(58) Field of Classification Search
USPC .......................................................... 184/26
See application file for complete search history.

(56) References Cited

FOREIGN PATENT DOCUMENTS

| | | |
|---|---|---|
| CN | 204942996 | 1/2016 |
| CN | 204986342 | 1/2016 |
| CN | 205877673 | 1/2017 |
| CN | 206036621 | 3/2017 |
| CN | 207421739 | 5/2018 |
| EP | 0985825 | 1/2005 |
| GB | 123970 | 11/1919 |
| GB | 521554 | 5/1940 |
| JP | S60164184 | 8/1985 |
| JP | H10184980 | 7/1998 |
| JP | 2001271955 | 10/2001 |
| JP | 2009257339 | 11/2009 |
| KR | 101409983 | 6/2014 |

OTHER PUBLICATIONS

"Notice of allowance of Japan Counterpart Application", dated May 25, 2021, p. 1-p. 3.
Office Action of India Counterpart Application, dated Feb. 1, 2021, pp. 1-6.
Groeneveld, "Parts Manual Automatic Twin Greasing System," Jun. 2015, pp. 1-52.

* cited by examiner

GREASE PUMPING DEVICE

CROSS-REFERENCE TO RELATED APPLICATION

This is a continuation-in-part application of International Application No. PCT/CN2018/108859, filed on Sep. 29, 2018, which claims the priority benefits of China Application No. 201711016253.8, filed on Oct. 25, 2017. The entirety of each of the above-mentioned patent applications is hereby incorporated by reference herein and made a part of this specification.

BACKGROUND

Technical Field

The invention relates to a grease pumping device for injecting lubricating grease into a bearing, and belongs to the field of grease lubrication.

Description of Related Art

The centralized lubrication system is commonly utilized in many industries such as large-scale construction machinery, military machinery, long-distance automatic production lines, and outdoor working vehicles and machinery in alpine regions. Centralized lubrication systems usually adopt a grease pumping device to pump lubricating grease to the grease dispenser, which is then transported to the parts to be lubricated through the grease dispenser.

Currently, a common grease pumping device is a plunger type grease pumping device, which specifically includes a grease tank for storing lubricating grease, a driver, a plunger pair, and a pump body for installing the aforementioned components. A grease suction port of the plunger pair communicates with the grease tank, an output rotating shaft of the driver is sleeved with an eccentric wheel, and a plunger of the plunger pair abuts against a rim of the eccentric wheel along a radial direction of the output rotating shaft. During operation, the output rotating shaft of the driver is rotated in the forward and reverse directions and drives the eccentric wheel to rotate in the forward and reverse directions, thereby driving the plunger of the plunger pair to move reciprocally, so that the grease suction port of the plunger pair can absorb a certain amount of lubricating grease and the lubricating grease is delivered to a part to be lubricated through a grease drain port of the plunger pair. Specifically, a reversing valve is provided on a lubricating pipeline communicating with the grease drain port of the plunger pair, and the reversing valve is arranged with at least two valve positions. When the reversing valve is located at a first valve position, the lubricating grease can be delivered to the part to be lubricated, which is commonly referred to as a pressurization phase. When the reversing valve is at a second valve position, the remaining lubricating grease can flow back to the grease tank, which is commonly referred to as a pressure relief phase. Specifically, the reversing valve has a grease inlet, a grease return port and at least one grease outlet, wherein the grease inlet is in communication with the grease drain port of the plunger pair, the grease return port is in communication with the grease tank, and the grease outlet is in communication with lubricating pipeline. When the reversing valve is at the first valve position, the grease inlet thereof communicates with the grease outlet, so that the lubricating grease sucked by the plunger pair flows into the lubricating pipeline through the grease drain port of the plunger pair, the grease inlet and the grease outlet of the reversing valve, and then is delivered to the part to be lubricated. When the reversing valve is at the second valve position, the grease outlet thereof communicates with the grease return port, so that the remaining lubricating grease in the lubricating pipeline flows back to the grease tank through the grease outlet and the grease return port of the reversing valve. The current grease pumping devices mostly adopts electromagnetic reversing valves. Since the reversing valves are affected by lubricating grease and thus having a relatively large reversing resistance, the electric-controlled reversing valve is prone to burnout, and the structure of hydraulically controlled reversing valve is too complex and has relatively large volume.

SUMMARY

Technical Problem

The purpose of the present invention is to provide a grease pumping device. The overall structure of the grease pumping device is more compact and takes up less space.

In order to solve the above technical problem, the grease pumping device provided by the present invention includes a pump body, a driving mechanism with an output rotating shaft, and at least one plunger pair driven by the driving mechanism, and further includes a reversing valve and a lever mechanism provided in the pump body. A switching action between each valve position of a valve core of the reversing valve is driven by a swinging action of the lever mechanism. The output rotating shaft drives a toggle member rotating therewith, and when the output rotating shaft rotates reciprocally in forward and reverse directions, the toggle member toggles the lever mechanism in the forward and reverse directions, such that the lever mechanism swings reciprocally, thereby changing the valve position of the reversing valve. At least one of the lever mechanism and the toggle member is an elastic structure, when the output rotating shaft rotates in the forward direction or the reverse direction, the toggle member contacts the lever mechanism and drives the valve core to operate, and when the valve core is switched to a corresponding valve position, the toggle member and the lever mechanism slide relatively by the elastic deformation of the elastic structure.

The grease pumping device of the present invention utilizes a mechanical reversing valve to replace the electromagnetic valve in the related art. Meanwhile, the reversing valve is arranged in a housing, so that the overall structure is compact and takes up less space. Also, the inconvenience caused by external configuration of the reversing valve can be avoided. The reversing power of the reversing valve of the invention comes from driving components that drive the plunger pair to operate, and the power is transmitted to the valve core of the reversing valve by the cooperation of the lever mechanism and the toggle member, and the forward and reversing rotations of the output rotating shaft can drive the valve core to reciprocate in the valve body to realize switching of working positions. As compared with the electromagnetic reversing valve, the mechanical reversing valve structure saves power and lowers costs.

Further, the reversing valve is a slide valve structure.

Further, the reversing valve is a two-position reversing valve.

Specifically, the two-position reversing valve is a four-way reversing valve. When at a first valve position, the first grease outlet of the two-position reversing valve communicates with the grease inlet of the two-position reversing valve, and the second grease outlet communicates with the grease return port of the two-position reversing valve. When at a second valve position, the first grease outlet of the two-position reversing valve communicates with the grease return port of the two-position reversing valve, and the second grease outlet communicates with the grease inlet of the two-position reversing valve.

Alternatively, the two-position reversing valve is a three-way reversing valve. When at the first valve position, the grease inlet of the two-position reversing valve is in communication with the grease outlet of the two-position reversing valve; when at the second valve position, the grease inlet, the grease outlet and the grease return port of the two-position reversing valve are in connection with each other.

Alternatively, the two-position reversing valve is a two-way switching valve.

On the basis of any of the above-mentioned various technical solutions, the lever mechanism is the elastic structure and includes a combined lever. The combined lever includes a first lever body and a second lever body. One end of the first lever body is hinged with the valve body and a hinged point forms a fulcrum, the other end of the first lever body is hinged with the second lever body, the second lever body cooperates with the toggle member, and the lever mechanism further includes an elastic member located at a hinged location of the first and second lever bodies to keep the two lever bodies in a collinear state. After the second lever body is shifted from the toggle member, the elastic member makes the second lever body return to a position where the second lever body is collinear with the first lever body. The elastic member can deflect the second lever body relative to the first lever body within a certain angle range. In this way, when the toggle member toggles the second lever body, under the action of the elastic member, the first lever body can also receive a certain amount of toggling power, thereby driving the valve core to switch the valve position. After the second lever body is shifted to a certain angle by the toggle member, the toggle member is shifted from the second lever body, and the second lever body can return to the position of being collinear with the first lever body under the action of the elastic member. When the second lever body is at the position, the second lever body can be toggled again by the toggle member during the rotation of the toggle member.

On the basis of the above solution, the elastic member may be further defined as a U-shaped spring clip, a clamping opening of the U-shaped spring clip faces the second lever body from the fulcrum, and a clamping length of the U-shaped spring clip is greater than a length of the first lever body and smaller than a sum of the length of the first lever body and a length of the second lever body. The U-shaped spring clip is utilized to clamp the first and second lever bodies and provide elastic restoring force to the second lever body, and the structure is simple.

Alternatively, on the basis of any of the above various technical solutions, the lever mechanism is the elastic structure, and includes a rocker arm hinged on the valve body and an elastic piece provided on one end of the rocker arm, and a hinged point of the rocker arm and the valve body constitutes a fulcrum, the valve core is hinged on the rocker arm, and the elastic piece is toggled by the toggle member when the output rotating shaft rotates.

Alternatively, on the basis of any of the above-mentioned various technical solutions, the toggle member is the elastic structure.

On the basis of the above various technical solutions, it can be limited that there are at least two of the plunger pairs in the pump body, and the grease drain ports of each plunger pair are in communication with each other.

Alternatively, on the basis of any of the above-mentioned various technical solutions, at least one of the lever mechanism and the toggle member is provided with a rolling member that is independently rotatable, and the rolling member is configured to reduce friction and resistance when the lever mechanism and the toggle member slide relatively.

Further, one of the lever mechanism and the toggle member is the elastic structure, and the rolling member is disposed on another one of the lever mechanism and the toggle member.

Further, the rolling member is a miniature bearing or ball or roller.

DESCRIPTION OF THE EMBODIMENTS

The core of the present invention is to provide a grease pumping device. The overall structure of the grease pumping device is more compact and takes up less space.

In order to enable those skilled in the art to better understand the solution of the present invention, the present invention is further described in detail below with reference to the accompanying drawings and specific embodiments.

Figure 1:
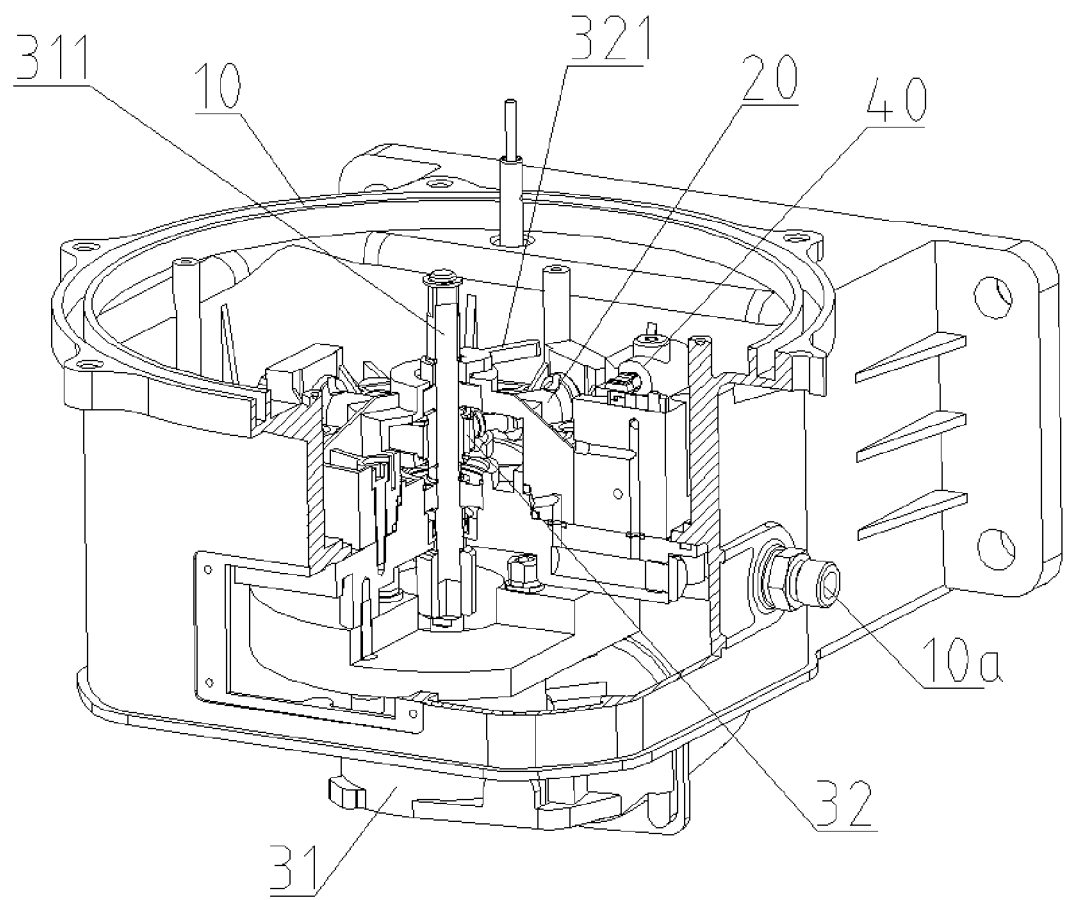
FIG. 1 is a schematic structural view of a grease pumping device in a specific embodiment.
Figure 2:
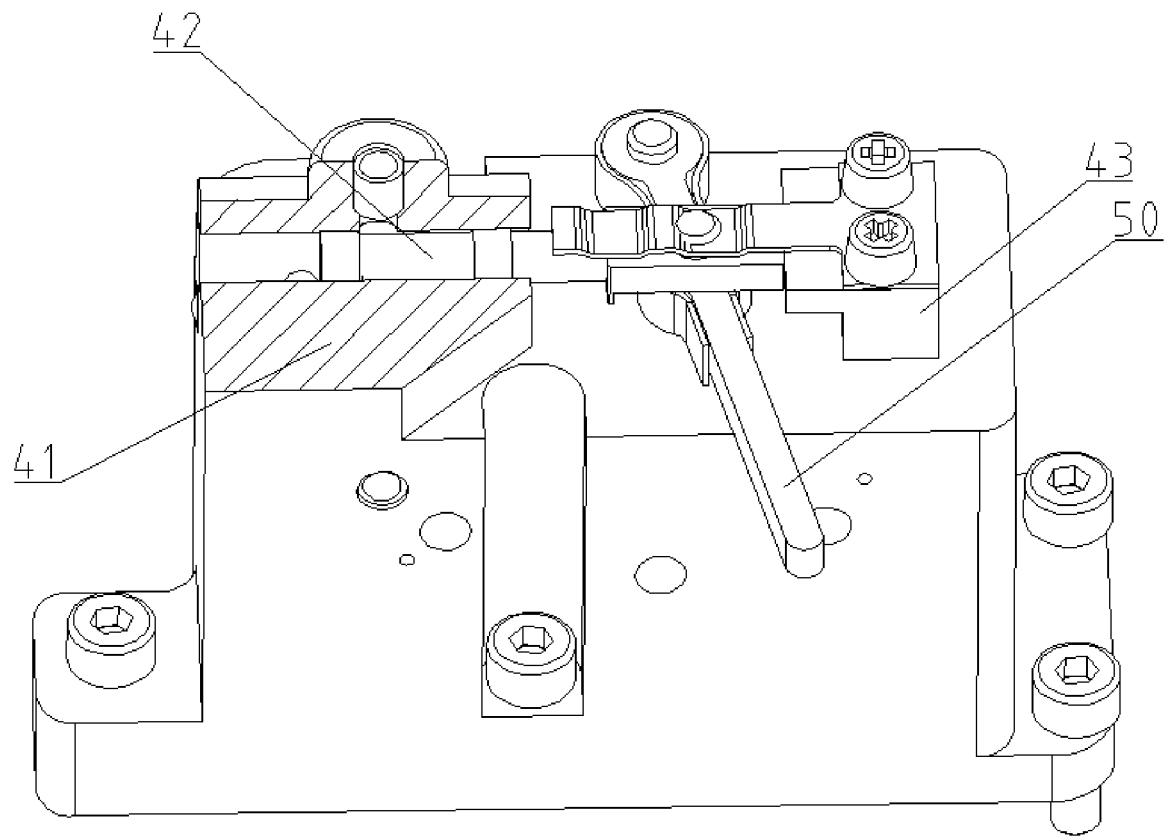
FIG. 2 is a schematic structural view of the cooperation between the two-position reversing valve and the lever mechanism in FIG. 1.

Please refer to FIG. 1. FIG. 1 is a schematic structural view of a grease pumping device in a specific embodiment.

In this embodiment, the grease pumping device provided by the present invention includes a pump body 10, at least one plunger pair 20 installed in the pump body 10 and a driving mechanism. A grease suction port of the plunger pair 20 communicates with the grease tank 60. The driving mechanism can drive a plunger of the plunger pair 20 to perform reciprocated movement and pump the lubricating grease in the grease tank 60 from a grease drain port of the plunger pair 20. A two-position reversing valve 40 is provided between the plunger pair 20 and an external pipeline.

In this embodiment, the two-position reversing valve 40 is disposed in the pump body 10, a grease inlet thereof is in communication with the grease drain port of the plunger pair 20, a grease return port thereof is in communication with the grease tank 60, and the grease outlet thereof is in communication with the external pipeline. The grease outlet of the two-position reversing valve 40 is an output port 10a of the grease pumping device.

The grease pumping device further includes a lever mechanism 50, which is driven by the driving mechanism to drive a valve core 42 of the two-position reversing valve 40 to switch between a first valve position and a second valve position, such that the grease pumping device switches between a pressurization phase and an unloading phase.

The pressurizing phase refers to a phase where the grease pumping device pumps the lubricating grease to a part to be lubricated, and the unloading phase refers to a phase where the remaining lubricating grease returns to the grease tank 60.

In the grease pumping device provided by the present invention, the two-position reversing valve 40 communicating with the grease drain port of the plunger pair 20 is provided in the pump body 10, and the valve core 42 of the two-position reversing valve 40 is driven by the lever mechanism 50 to switch position. The lever mechanism 50 is driven by the existing driving mechanism that drives the plunger pair 20 to move, and there is no need to additionally dispose a driving member. Compared with the externally configured reversing valve in the related art, the two-position reversing valve 40 in the solution is disposed in the pump body 10 so that the overall structure of the grease pumping device is more compact and occupies a small space. In the meantime, the solution also avoids the inconvenience caused by external configuration of the reversing valve. In addition, in this solution, the position switching of the valve core 42 of the two-position reversing valve 40 is realized through the driving of the mechanical lever mechanism 50. As compared with the electromagnetic reversing valve in the related art, the mechanical reversing valve is more reliable during reversion and occupies less space.

In a specific solution, the driving mechanism includes a driver and an eccentric wheel 32. The motor 31 serves as a driver in the invention for description. It should be understood that the driver may also be other structures. An output rotating shaft 311 of the motor 31 can be rotate in forward and reverse directions, and the eccentric wheel 32 is fixed on the output rotating shaft 311 of the motor 31 by a flat key. The plunger of the plunger pair 20 abuts against a rim of the eccentric wheel 32 in a radial direction of the output rotating shaft 311. Specifically, the output rotating shaft 311 may be a two-segment coupling structure, one segment of which is fixed in the motor 31 and the other segment is inserted in the eccentric wheel 32 for easy assembly. Certainly, in actual configuration, the output rotating shaft 311 may be a one-segment structure. In this way, the eccentric wheel 32 is driven to rotate in forward and reverse directions by the motor 31, so that the plunger of the plunger pair 20 reciprocates along the radial direction of the output rotating shaft 311, and the lubricating grease in the grease tank 60 is pumped out in a fixed amount. The lever mechanism 50 has a variety of specific structures, which are described in detail in the following five embodiments.

Please refer to FIG. 2 to FIG. 6 for an embodiment 1 of the lever mechanism 50. In the embodiment, the lever mechanism 50 includes a combined lever. The combined lever includes a first lever body 511 and a second lever body 512. The lever mechanism further includes a spring clip 513. A first end of the first lever body 511 is rotatably connected to a valve body 41 of the two-position reversing valve 40; specifically, they can be connected by means of a pin. A second end of the first lever body 511 is hinged with a first end of the second lever body 512. Moreover, an outer end of the valve core 42 is hinged with the second end of the first lever body 511. Specifically, a through hole may be disposed at the second end of the first lever body 511, the first end of the second lever body 512, and the outer end of the valve core 42, and those three ends can be connected through a pin.

Figure 3:
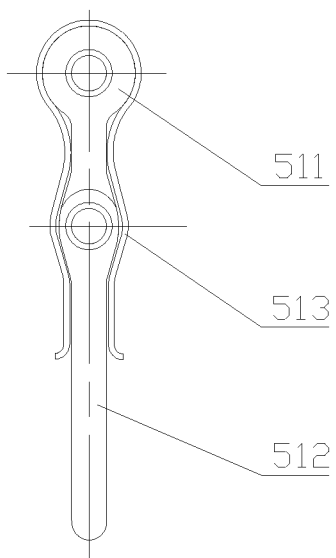
FIG. 3 is a schematic structural view of a lever mechanism in an embodiment 1 of a grease pumping device.
Figure 4A:
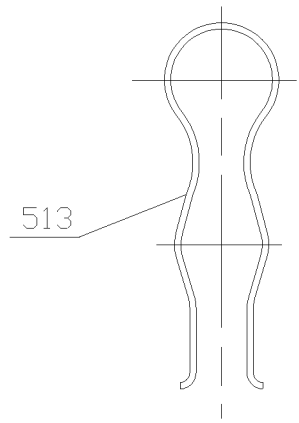
FIG. 4a-FIG. 4c respectively illustrate schematic structural views of a spring clip, a first lever body and a second lever body of the lever mechanism in FIG. 3.
Figure 4B:
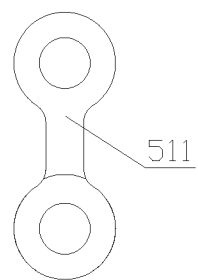
Figure 4C:
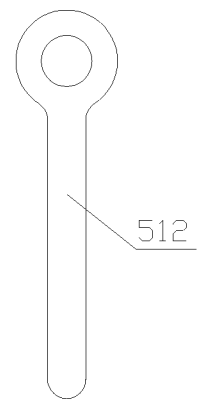
Figure 5:
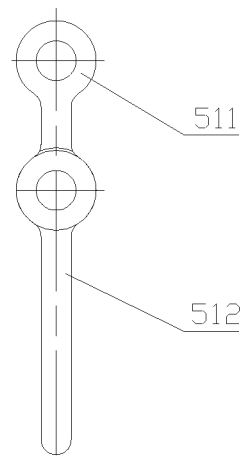
FIG. 5 is a schematic structural view of cooperation between the first lever body and the second lever body of the lever mechanism in FIG. 3.
Figure 6:
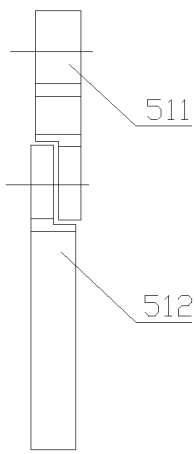
FIG. 6 is a left side view of FIG. 5.

The first lever body 511 and the second lever body 512 are sandwiched in the spring clip 513. As shown in FIG. 3, a contour of the spring clip 513 matches a peripheral wall of the first lever body 511 and the second lever body 512 after being fitted, that is, the spring clip 513 is a U-shaped spring clip. In addition, there is a predetermined gap between two sides of the second lever body 512 and the clips of the spring clip 513. The spring force of the spring clip 513 keeps the first lever body 511 and the second lever body 512 always in a collinear state, that is, once the external force disappears, the first lever body 511 and the second lever body 512 will be in the collinear state under the spring force of the spring clip 513.

After assembling as above, under the action of external force, the first lever body 511 can rotate around its first end, and the first lever body 511 can drive the valve core 42 to move during the rotation process, thereby changing the position of the valve core 42. After the rotation of the first lever body 511 is hindered, the second lever body 512 hinged thereto can still rotate around the second end (that is, the first end of the second lever body 512) of the first lever body 511 under the effect of external force.

In order to avoid excessive movement of the valve core 42, the corresponding position on the valve body 41 is also provided with a position-limiting member 43 that limits the position of the valve core 42. When the valve core 42 is moved to the place, the valve core 42 is stopped by the position-limiting member 43, and the first lever body 511 cannot rotate continuously, so that the valve core 42 can be maintained in the corresponding valve position.

The output rotating shaft 311 of the driving mechanism is provided with a toggle member 321. When the toggle member 321 rotates under the driving of the motor 31, the toggle member 321 can push the second end of the second lever body 512, thereby driving the lever mechanism 50 to operate. Certainly, in other embodiments, the toggle member 321 may also be provided on the eccentric wheel.

The following detailed description is provided with reference to FIGS. 7a-7d to FIGS. 8a-8d to describe how the lever mechanism 50 in this embodiment drives the valve core 42 to switch positions under the driving of the driving mechanism.

Referring to FIGS. 7a-7d first, FIGS. 7a-7d illustrate schematic views showing positions of the valve core switched from the first valve position to the second valve position under the driving of the lever mechanism shown in FIG. 3.

Figure 7A:
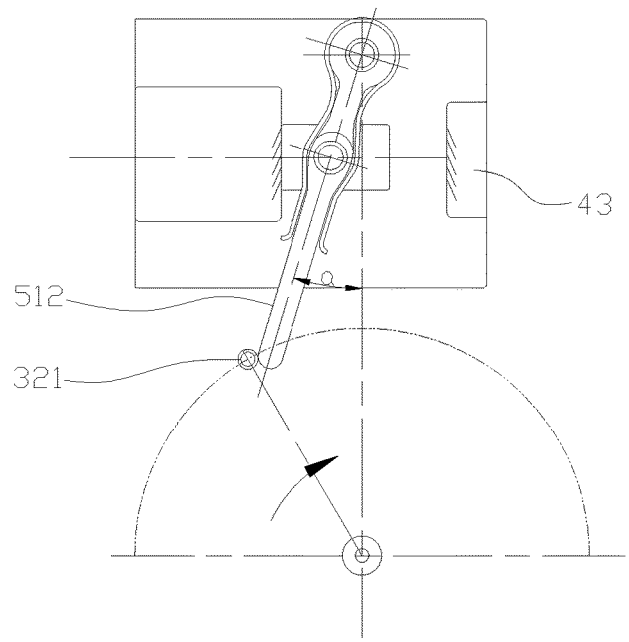
FIG. 7a-FIG. 7d respectively illustrate schematic views showing positions of a valve core switched from a first valve position to a second valve position under the drive of the lever mechanism shown in FIG. 3.

When the motor 31 drives the output rotating shaft 311 to rotate in the forward direction (that is, rotate clockwise), the toggle member 321 provided thereon rotates in the forward direction and contacts the second end of the second lever body 512 of the lever mechanism 50, as shown in FIG. 7a. When the toggle member continues to rotate, the toggle member pushes the second lever body 512, which drives the whole lever mechanism 50 to rotate. Due to the clamping effect of the spring clip 513, under the circumstances, the first lever body 511 and the second lever body 512 rotate as a whole, and the valve core 42 is drawn to move during this process to switch from the first valve position to the second valve position. The spring clip 513 should have sufficient rigidity so that the first lever body 511 and the second lever body 512 can keep rotating as a whole.

Figure 7B:
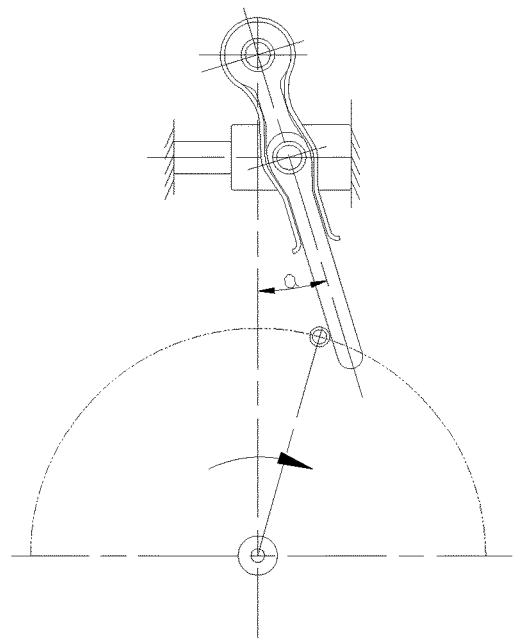
Figure 7C:
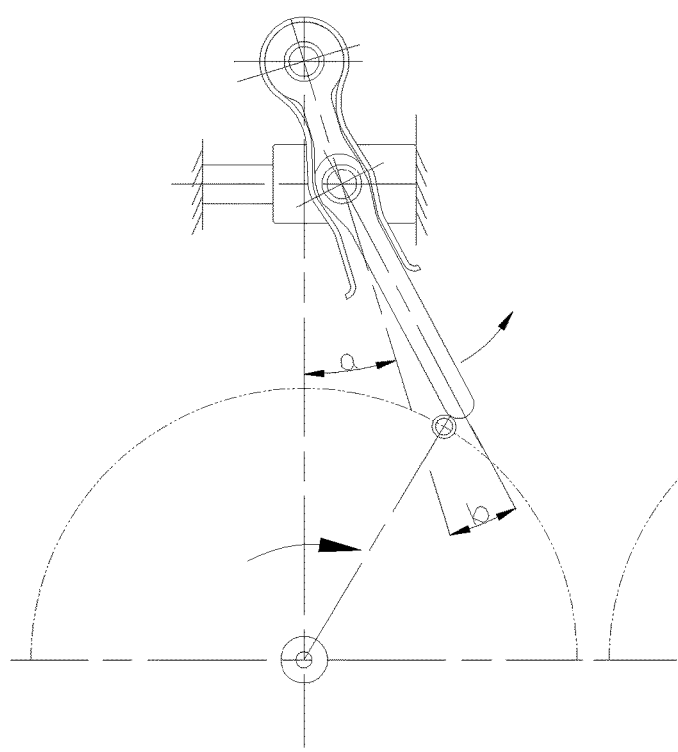
Figure 7D:
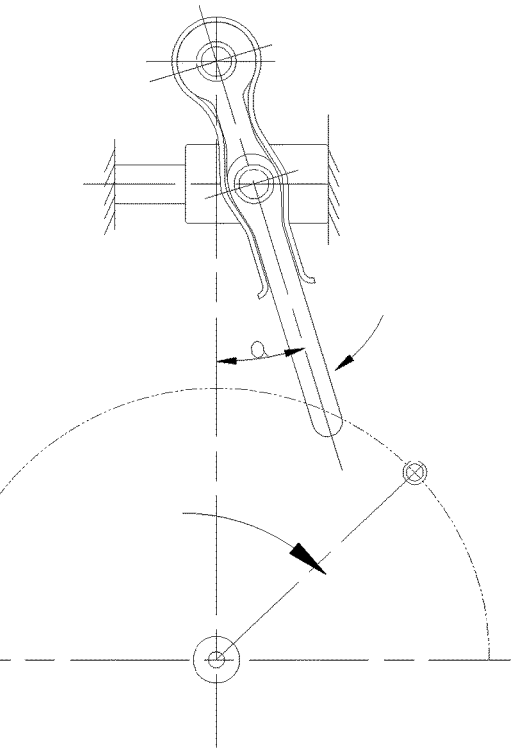

When the valve core 42 is switched to the second valve position, the valve core 42 stops moving due to the stopping action of the corresponding position-limiting member 43. Correspondingly, the rotation of the first lever body 511 is also restricted as shown in FIG. 7b. Under the circumstances, the toggle member 321 is still in contact with the second lever body 512, and the toggle member 321 further rotates to push the second lever body 512 to continue to rotate. It can be understood that, because the first lever body 511 is restricted, only the second lever body 512 rotates around its first end as shown in FIG. 7c. During the process, the toggle member 321 presses the second lever body 512, and the second lever body 512 contacts the clip on the corresponding side of the spring clip 513 and pushes the clip to elastically deform and rotate together until the toggle member 321 crosses over the second lever body and disengages from the second lever body 512. When the toggle member 321 is continuously operated clockwise or counterclockwise, this movement relationship between the toggle member 321 and the combined lever will continue, that is, the toggle member will continue to cross over the rotating member, and the reversing valve will not reverse. After the toggle member 321 is disengaged from the second lever body 512, the second lever body 512 is restored under the action of the clip of the spring clip 513 as shown in FIG. 7d. That is, the second end of the second lever body 512 is restored to the movement track of the toggle member 321, such that the toggle member 321 can still contact and push the second lever body 512 when the toggle member 321 is reversed. At this time, the toggle member 321 will drive the combined lever to rotate and drive the reversing valve to reverse.

It should be understood that in FIG. 7c to FIG. 7d, since the first lever body 511 does not move, the valve core 42 is restricted by the position-limiting member 43 and cannot move either, the valve core 42 can be maintained at the second valve position. In the process, only the second lever body 512 makes movement.

In this embodiment, the valve core has a fixed moving stroke. When the valve core moves to the maximum stroke, it stops. The rotation range of the lever mechanism is designed according to the moving stroke of the valve core.

Referring further to FIGS. 8a-8d, illustrating schematic views showing positions of the valve core switched from the second valve position to the first valve position under the driving of the lever mechanism shown in FIG. 3.

Figures 8A, 8B:
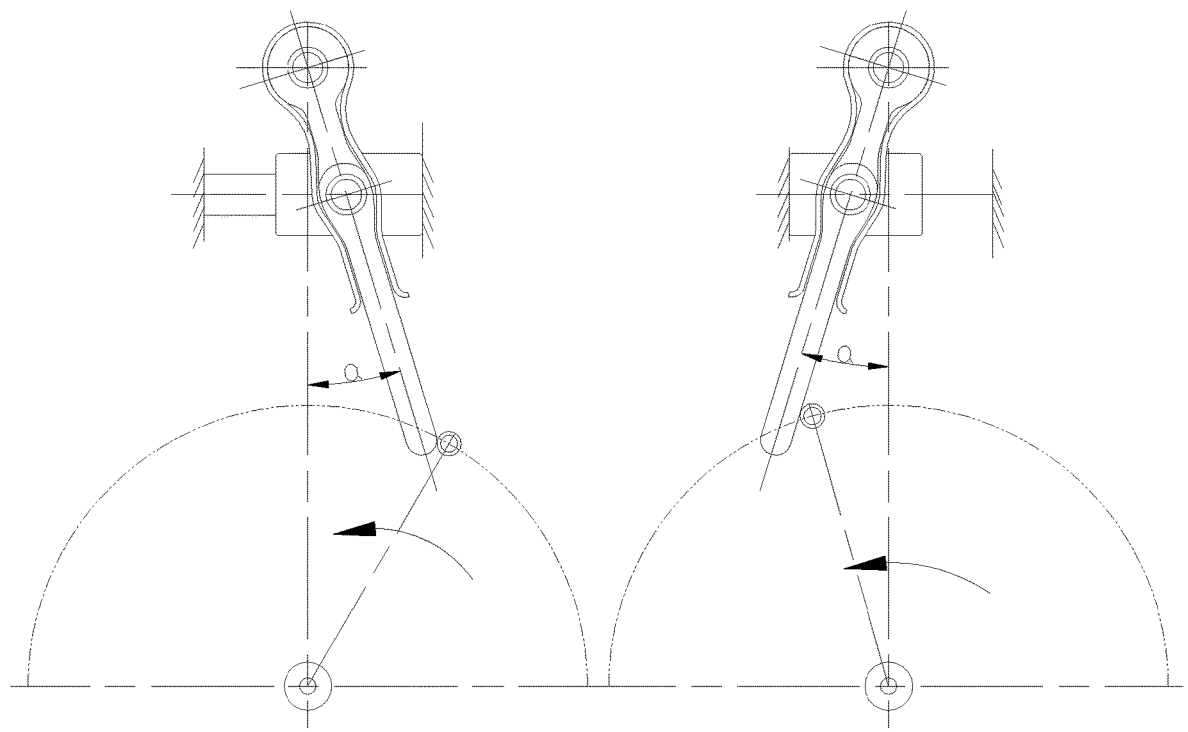
FIG. 8a-FIG. 8d respectively illustrate schematic views showing positions of the valve core switched from the second valve position to the first valve position under the drive of the lever mechanism shown in FIG. 3.

When the motor 31 drives the output rotating shaft 311 to rotate in the reverse direction (that is, rotate counterclockwise), the toggle member 321 provided thereon reverses and contacts the second end of the second lever body 512 of the lever mechanism 50 as shown in FIG. 8a. When the output rotating shaft 311 continues to rotate, the toggle member 321 pushes the second lever body 512, which drives the whole lever mechanism 50 to rotate. Due to the clamping effect of the spring clip 513, under the circumstances, the first lever body 511 and the second lever body 512 rotate as a whole and pull the valve core 42 to move during the process to switch from the second valve position to the first valve position. It can be understood that the spring clip 513 should have sufficient rigidity so that the first lever body 511 and the second lever body 512 can keep rotating as a whole.

Figures 8C, 8D:
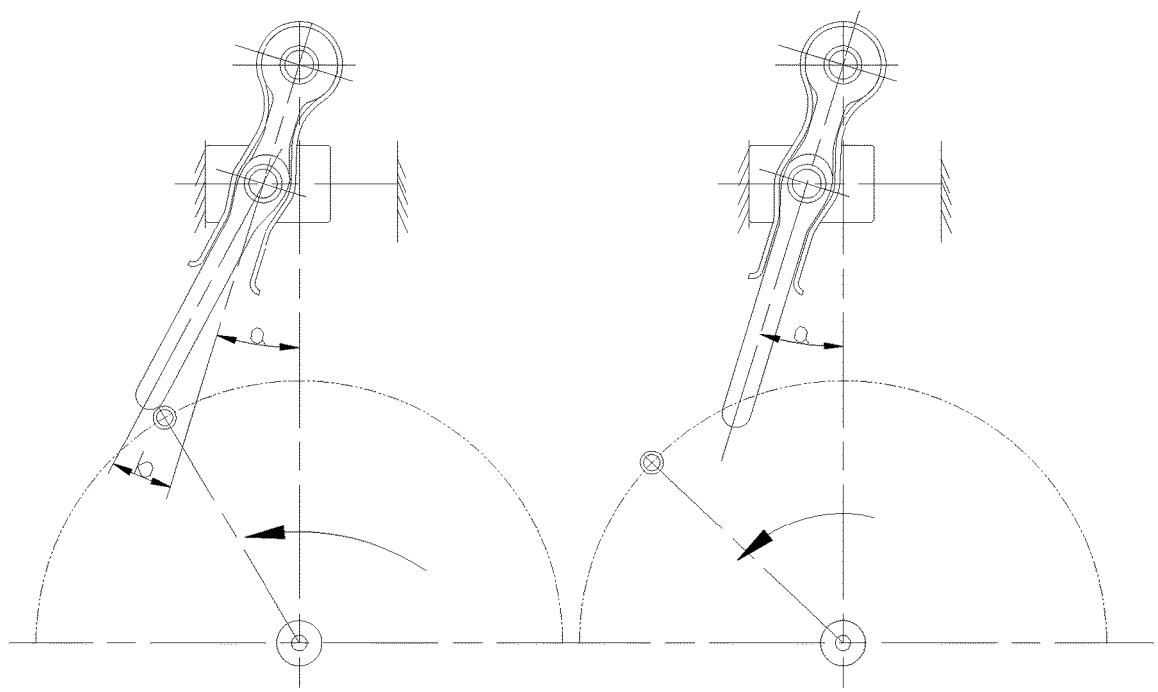

When the valve core 42 is switched to the first valve position, the valve core 42 stops moving due to the stopping effect of the corresponding position-limiting member 43. In the meantime, the rotation of the first lever body 511 is restricted as shown in FIG. 8b. At this time, the toggle member 321 is still in contact with the second lever body 512, the output rotating shaft 311 is further rotated, and the toggle member 321 pushes the second lever body 512 to continue to rotate. It can be understood that, at this time, since the first lever body 511 is restricted, only the second lever body 512 rotates around its first end as shown in FIG. 8c. In the process, the second lever body 512 contacts the clip on the corresponding side of the spring clip 513 and pushes the clip to rotate together until the toggle member 321 disengages from the second lever body 512. After the toggle member 321 is disengaged from the second lever body 512, the second lever body 512 is restored due to the effect of the clip of the spring clip 513 as shown in FIG. 8d, that is, the second end of the second lever body 512 is restored to the movement track of the toggle member 321, so that the toggle member 321 can still contact and push the second lever body 512 when the toggle member 321 rotates in forward direction.

Similarly, in FIG. 8c to FIG. 8d, since the first lever body 511 does not move, the valve core 42 is restricted by the position-limiting member 43 and cannot move either, the valve core 42 can be maintained at the first valve position. In the process, only the second lever body 512 makes movement.

Figure 20:
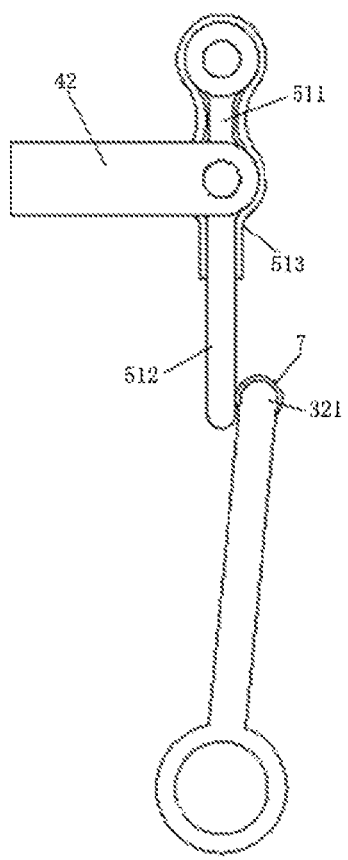
FIG. 20 illustrates a schematic structural view of cooperation between a lever mechanism and a toggle member in an embodiment of a grease pumping device.
Figure 21:
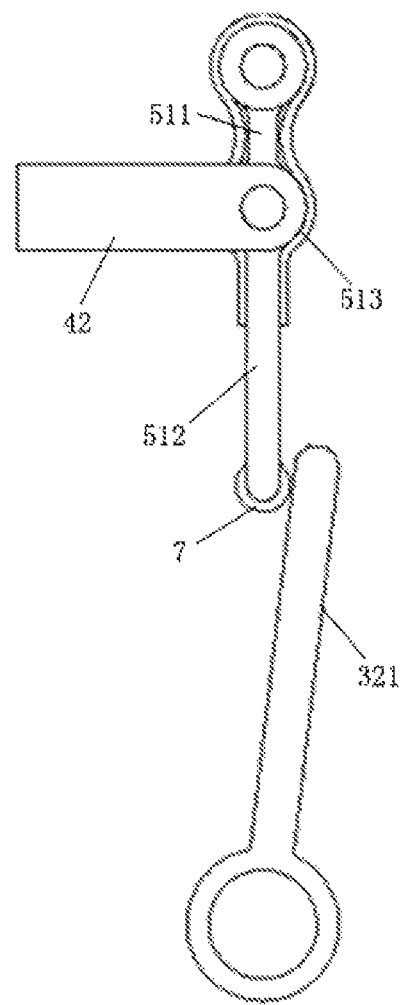
FIG. 21 illustrates another schematic structural view of cooperation between a lever mechanism and a toggle member in an embodiment of a grease pumping device.
Figure 22:
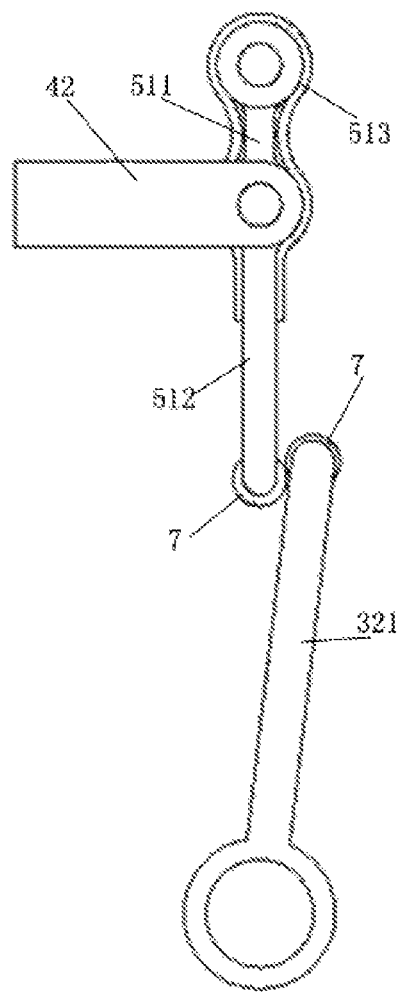
FIG. 22 illustrates another schematic structural view of cooperation between a lever mechanism and a toggle member in an embodiment of a grease pumping device.

Of course, on the basis of the embodiment, other preferred embodiments may be performed. For example, installing a miniature bearing or ball or roller on a portion of the toggle member that contacts second lever body 512; alternatively, installing the miniature bearing or ball or roller on a portion of the second lever body 512 that contacts the toggle member; alternatively, installing the miniature bearing or ball or roller on both the second lever body and the toggle member. As such, when the second lever body and the toggle member relatively slide, the miniature bearing or ball or roller convert sliding friction into rolling friction, so as to exert an action of friction reduction and resistance reduction, such that the slide between the second lever body and the toggle member is much smoother. Specific in implementation, according to an area of the contact portion of the toggle member and the second lever body, proper number of the miniature bearing or ball or roller can be chosen for disposition, to make the contact portions thereof relatively slide in a sliding friction way. For the example that adopts the miniature bearing as the rolling member, the miniature bearing had better install on an end portion of the toggle member and/or the lever mechanism. As shown in FIG. 20 to FIG. 22 respectively illustrating three different implementing ways, which are installing the miniature bearing 7 merely on an end portion of the toggle member 321, installing the miniature bearing 7 merely on an end portion of the lever mechanism 512, and installing the miniature bearings 7 both on the end portions of the toggle member 321 and of the lever mechanism 512. During installing of the miniature bearing, it can be riveted on the toggle member by rivet, and an outer ring of the miniature bearing is flexibly rotatable around the rivet. For the example that adopts the ball as the rolling member, the ball may be installed on a side surface of the leverage of the lever mechanism, or installed on a side surface of the toggle member in sheet shape. Specifically, it is possible to provide a closed spherical groove formed on the side surface of the leverage or the side surface of the toggle member in sheet shape, and the ball is installed in the spherical groove.

Figure 9:
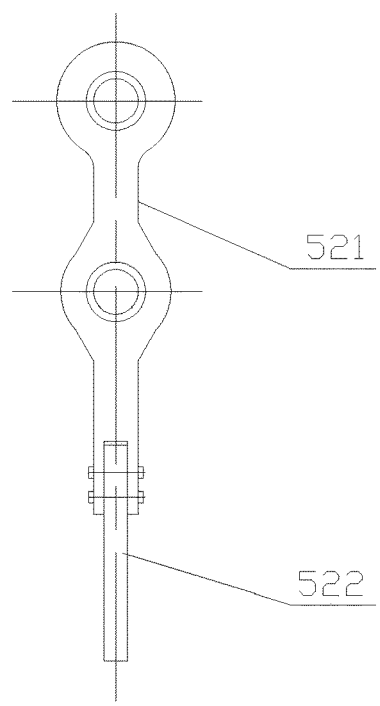
FIG. 9 is a schematic structural view of a lever mechanism in an embodiment 2 of a grease pumping device.

Please refer to FIG. 9 for an embodiment 2 of the lever mechanism 50. In the embodiment, the lever mechanism 50 includes a rocker arm 521 and an elastic piece 522, wherein a first end of the rocker arm 521 is rotatably connected to the valve body 41 of the two-position reversing valve 40, and a middle part of the rocker arm 521 is hinged to the valve core 42, the elastic piece 522 is fixed to a second end of the rocker arm 521. After assembly, under the effect of external force, the rocker arm 521 can rotate around its first end, and the rocker arm 521 can pull the valve core 42 to move during the rotation process, thereby changing the position of the valve core 42. Consistent with the foregoing embodiment 1, in order to prevent the valve core 42 from moving excessively, a corresponding position on the valve body 41 is further provided with a position-limiting member 43 for limiting the position of the valve core 42. When the valve core 42 is moved to the position, the rocker arm 521 cannot continue to rotate due to the value core 42 being stopped by the position-limiting member 43, so that the valve core 42 can be maintained at the corresponding valve position. In this embodiment, the toggle member 321 still needs to be provided on the output rotating shaft 311 of the driving mechanism to push the elastic piece 522, so that the lever mechanism 50 is driven to operate.

Please refer to FIGS. 10a-10d illustrating schematic views showing positions of the valve core switched from the first valve position to the second valve position under the driving of the lever mechanism shown in FIG. 9.

Figures 10A, 10B:
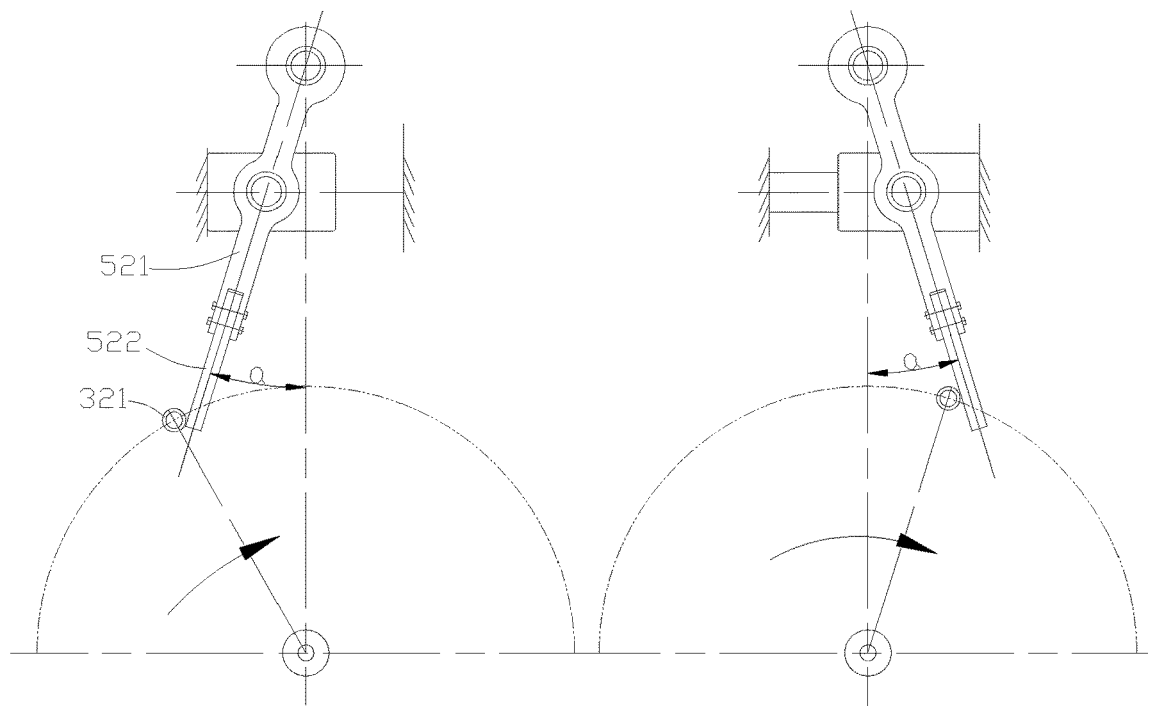
FIG. 10a-FIG. 10d respectively illustrate schematic views showing positions of a valve core switched from the first valve position to the second valve position under the drive of the lever mechanism shown in FIG. 9.

Similar to the switching process of the foregoing embodiment 1, in this embodiment, the output rotating shaft 311 is rotated in forward direction so that the toggle member 321 is in contact with the elastic piece 522 as shown in FIG. 10a. Thereafter, the output rotating shaft 311 continues to rotate, the toggle member 321 pushes the elastic piece 522, which drives the whole lever mechanism 50 to rotate. It can be understood that the elastic piece 522 should have sufficient rigidity so that the rocker arm 521 and the elastic piece 522 rotate as a whole. In the process, the valve core 42 is pulled to move and switches from the first valve position to the second valve position.

Figure 10C:
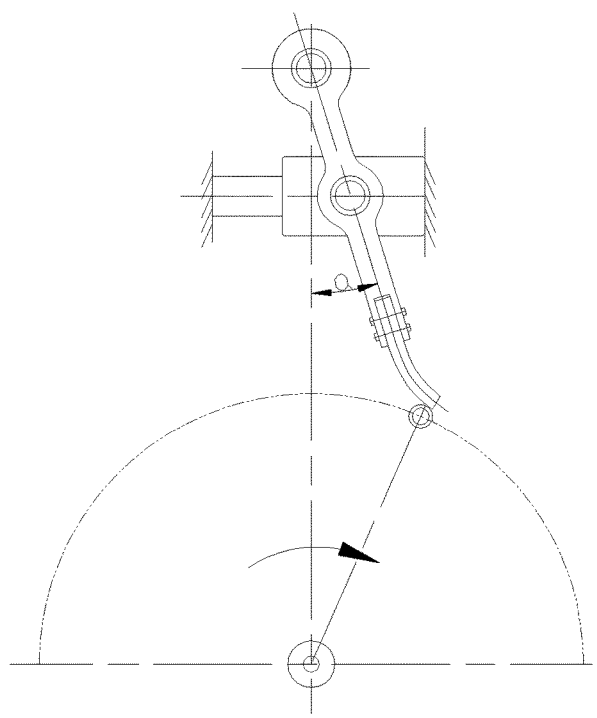

When the valve core 42 is switched to the second valve position, the valve core 42 is also affected by the stopping effect of the corresponding position-limiting member 43. The valve core 42 stops moving, and meanwhile, the rotation of the rocker arm 521 is restricted as shown in FIG. 10b. At this time, the toggle member 321 is still in contact with the elastic piece 522, and the output rotating shaft 311 is further rotated. The toggle member 321 pushes the elastic piece 522 to deform the elastic piece 522 as shown in FIG. 10c. The toggle member 321 continues to rotate along with the output rotating shaft 311 and disengages from the elastic piece 522. Since the force of the toggle member 321 disappears, the elastic piece 522 returns to its original shape as shown in FIG. 10d, that is, the elastic piece 522 is restored to the movement track of the toggle member 321, so that the toggle member 321 can still contact and push the elastic sheet 522 when the toggle member 321 is reversed.

Figure 10D:
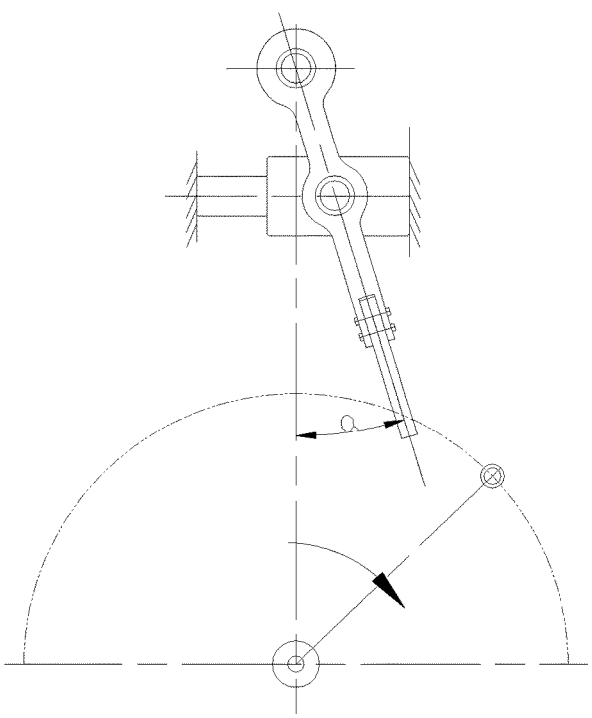
Figure 11A:
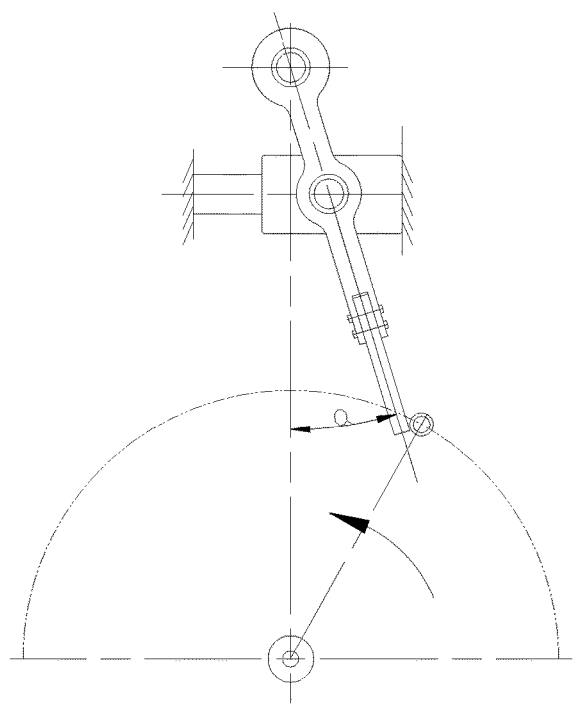
FIG. 11a-FIG. 11d respectively illustrate schematic views showing positions of the valve core switched from the second valve position to the first valve position under the drive of the lever mechanism shown in FIG. 9.
Figure 11B:
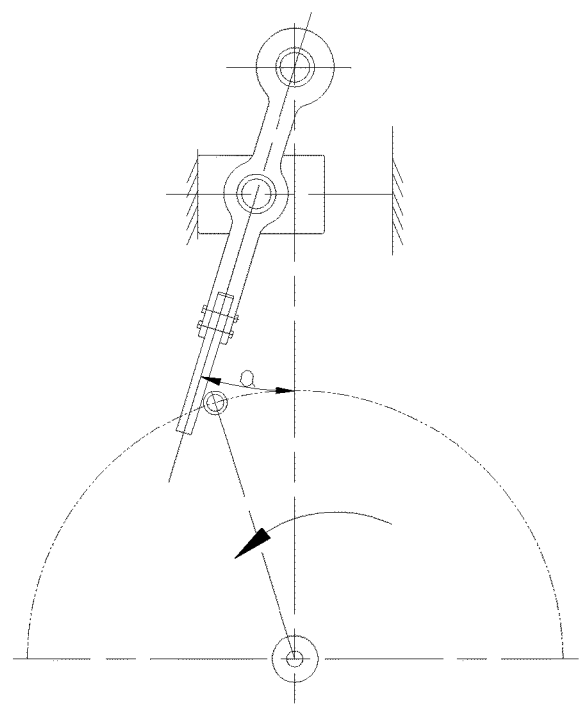
Figure 11C:
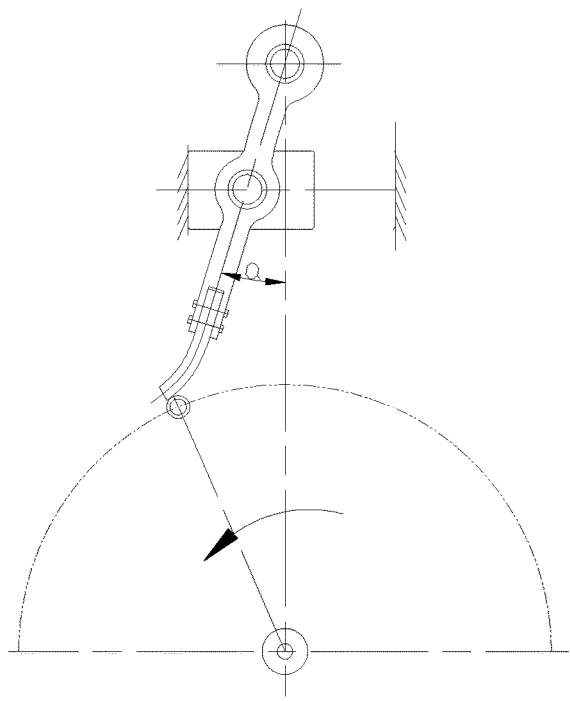
Figure 11D:
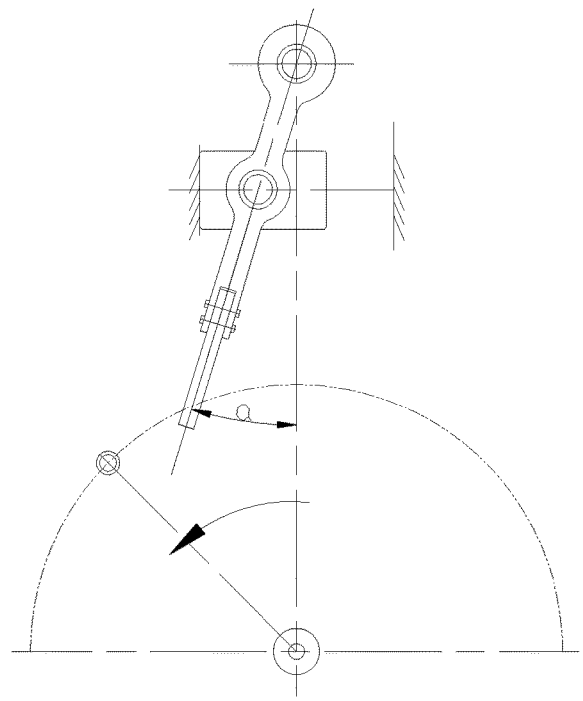

It can also be understood that in FIG. 10c to FIG. 10d, since the rocker arm 521 is not moved, the valve core 42 does not move either due to being restricted by the position-limiting member 43, and the valve core 42 can be maintained at the second valve position. In this process, only the elastic sheet 522 is deformed.

The process in which the valve core 42 is switched from the second valve position to the first valve position is similar to that described above, and is not repeated here. For details, please refer to FIGS. 11a-11d. FIGS. 11a-11d are schematic views showing the positions of the valve core switched from the second valve position to the first valve position under the driving of the lever mechanism shown in FIG. 9.

Preferably, a roller, a ball or a miniature bearing may be provided at a portion of the toggle member 321 that is in contact with the lever mechanism, such that it is possible to reduce the wear of the toggle member 321 and the lever mechanism. Alternatively, the roller, ball or miniature bearing may be provided at a portion of the lever mechanism that is in contact with the toggle member 321, as such, the wear of the toggle member 321 and the lever mechanism can be similarly reduced.

Figure 12:
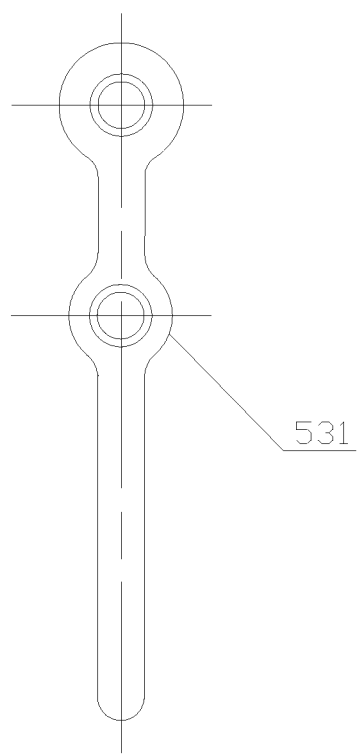
FIG. 12 is a schematic structural view of a lever mechanism in an embodiment 3 of a grease pumping device.

Please refer to FIG. 12 for an embodiment 3 of the lever mechanism 50. In this embodiment, the lever mechanism 50 includes a swing arm 531. A first end of the swing arm 531 is rotatably connected to the valve body 41 of the two-position reversing valve 40. A middle part of the swing arm 531 is connected to the valve core 42. After assembly, under the effect of external force, the swing arm 531 can rotate around its first end, and the swing arm 531 can pull the valve core 42 to move during the rotation process, thereby changing the position of the valve core 42. Similarly, in order to prevent the valve core 42 from moving excessively, the corresponding position on the valve body 41 is also provided with the position-limiting member 43 that limits the position of the valve core 42. In this embodiment, the toggle member 532 provided on the output rotating shaft 311 is an elastic structure. When the output rotating shaft 311 rotates, a second end of the swing arm 531 is pushed by the elastic toggle member 532 to drive the valve core 42 to move.

Figure 13A:
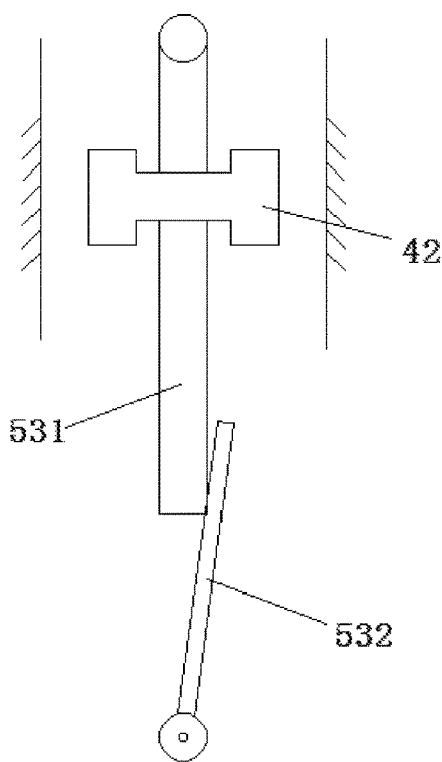
FIG. 13a-FIG. 13d respectively illustrate schematic views showing positions of a valve core switched to the first valve position under the drive of the lever mechanism shown in FIG. 12 (the lever mechanism is simplified in illustration).
Figure 13B:
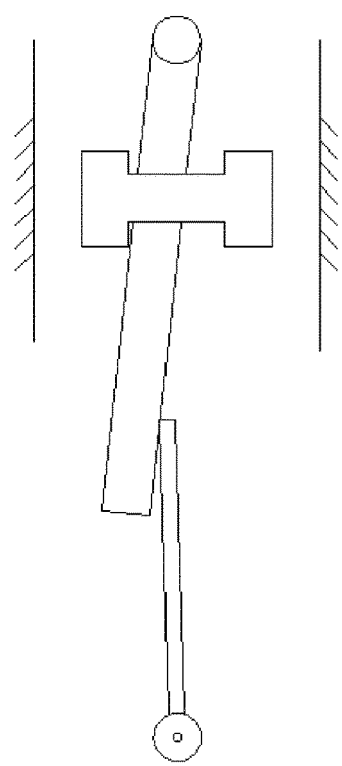

Please refer to FIGS. 13a-13d, which illustrate schematic views showing the positions of the valve core switched to the first valve position under the drive of the lever mechanism shown in FIG. 12. Similar to the switching process of the foregoing two embodiments, in this embodiment, the output rotating shaft 311 is rotated in forward direction so that the elastic toggle member 532 is in contact with the second end of the swing arm 531 as shown in FIG. 13a. Thereafter, the output rotating shaft 311 continues to rotate, the elastic toggle member 532 pushes the swing arm 531 to rotate. It can be understood that the elastic toggle member 532 should have sufficient rigidity to be able to push the swing arm 531 to rotate. During this process, the swing arm 531 pulls the valve core 42 to move and switch from the second valve position to the first valve position, as shown in FIG. 13b.

Figure 13C:
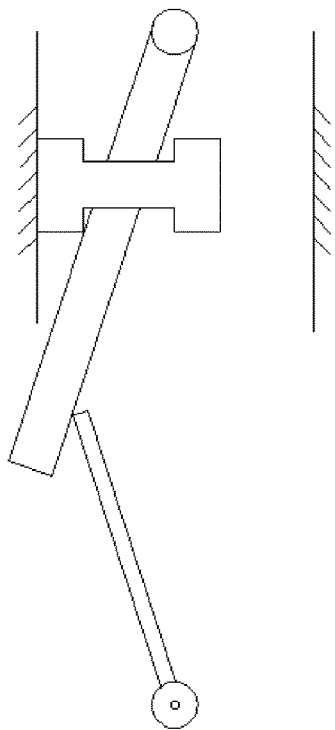
Figure 13D:
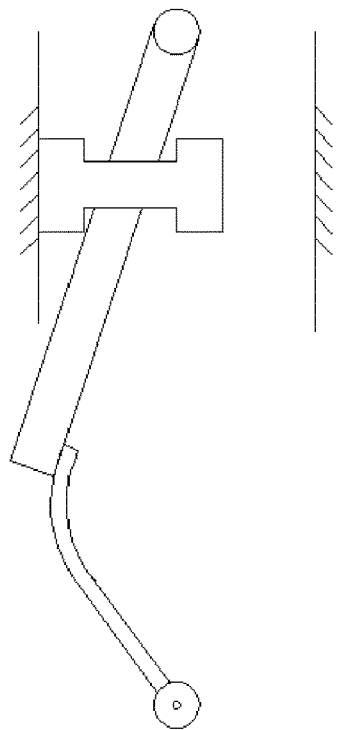
Figure 14A:
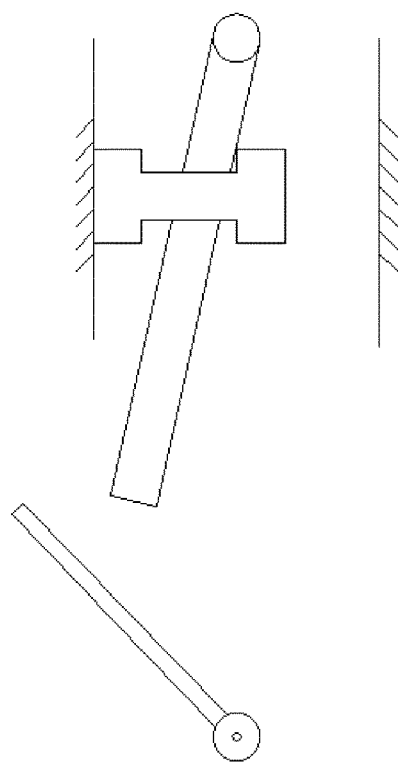
FIG. 14a-FIG. 14d respectively illustrate schematic views showing positions of the valve core switched from the first valve position to the second valve position under the drive of the lever mechanism shown in FIG. 12 (the lever mechanism is simplified in illustration).
Figure 14B:
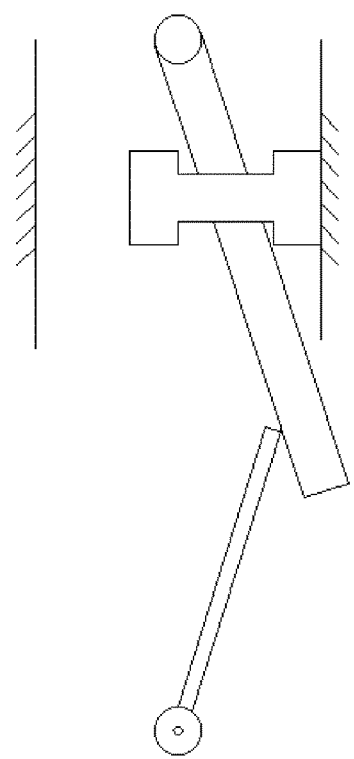
Figure 14C:
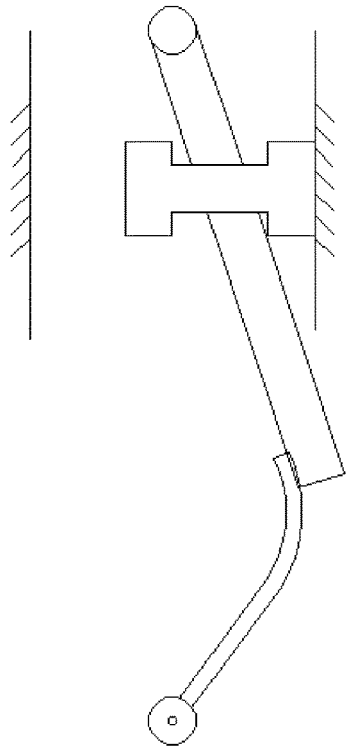
Figure 14D:
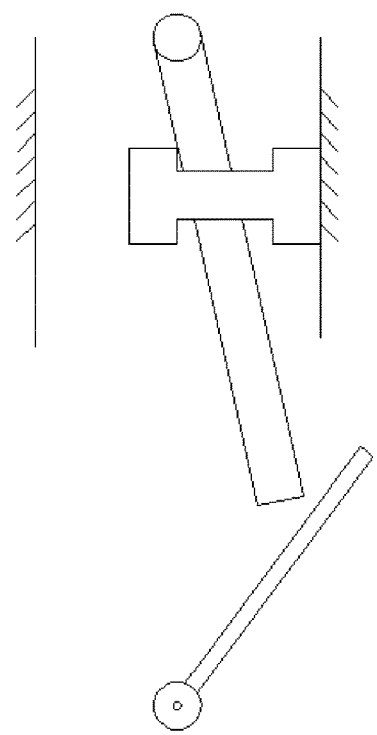

When the valve core 42 is switched to the first valve position, it is also affected by the stopping effect of the corresponding position-limiting member 43. The valve core 42 stops moving, and meanwhile, the rotation of the swing arm 531 is restricted as shown in FIG. 13c. At this time, the elastic toggle member 532 is still in contact with the swing arm 531, and the output rotating shaft 311 is further rotated. Since the swing arm 531 is no longer in motion, the elastic toggle member 532 is restricted and undergoes elastic deformation as shown in FIG. 13d. The elastic toggle member 532 continues to rotate along with the output rotating shaft 311 and disengages from the swing arm 531. After disengagement, the elastic toggle member 532 returns to its original shape as shown in FIG. 14a, so that the elastic toggle member 532 can still contact and push the swing arm 531 when it is reversed.

The process in which the valve core 42 is switched from the first valve position to the second valve position is similar to that described above, and is not repeated here. For details, please refer to FIGS. 14a-14d. FIGS. 14a-14d illustrate schematic views showing the positions of the valve core switched from the first valve position to the second valve position under the driving of the lever mechanism shown in FIG. 12.

Specifically, a roller may be provided at the contact position between the second end of the swing arm 531 and the elastic toggle member 532 to reduce the wear caused to the elastic toggle member 532.

In the above embodiment, the toggle member is an elastic piece to form an elastic structure. In other embodiments, the toggle member may adopt the structural form of the lever mechanism in the embodiment 1 to form an elastic structure. In the above embodiment, the swing arm is a rigid member. For the factor of effect in convenient installation, friction and resistance reduction, the roller served as the rolling member is installed on the one, of the toggle member and the lever mechanism, adopting a rigid structure. In other embodiments, it is possible to install the rolling member on the one, of the toggle member and the lever mechanism, adopting the elastic structure.

Figure 15:
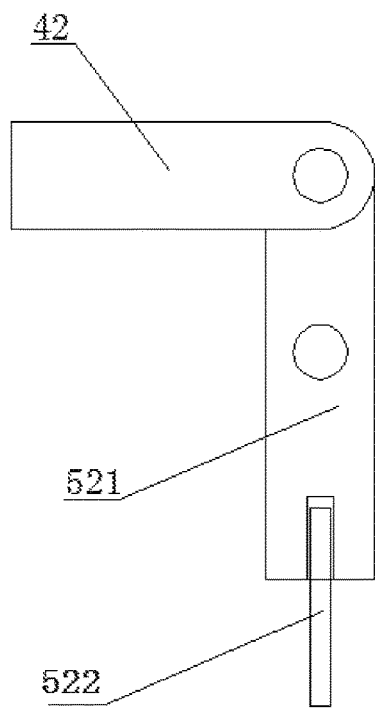
FIG. 15 is a schematic structural view of a lever mechanism in an embodiment 4 of a grease pumping device.

Please refer to FIG. 15 for an embodiment 4 of the lever mechanism 50. In the embodiment, the lever mechanism 50 includes the rocker arm 521 and the elastic piece 522. The middle part of the rocker arm 521 is rotatably connected to the valve body 41 of the two-position reversing valve 40, and the first end of the rocker arm 521 is hinged to the valve core 42. The elastic piece 522 is fixed to the second end of the rocker arm 521. After assembly, under the effect of external force, the rocker arm 521 can rotate around its middle part, and the rocker arm 521 can pull the valve core 42 to move during the rotation process, thereby changing the position of the valve core 42. Consistent with the foregoing embodiment 1, in order to prevent the valve core 42 from moving excessively, a corresponding position on the valve body 41 is further provided with a position-limiting member 43 for limiting the position of the valve core 42. When the valve core 42 is moved to the position, the rocker arm 521 cannot continue to rotate due to the value core 42 being stopped by the position-limiting member 43, so that the valve core 42 can be maintained at the corresponding valve position.

Consistent with the foregoing embodiment 1, in the embodiment, the toggle member 321 needs to be provided on the output rotating shaft 311 of the driving mechanism to push the elastic piece 522, thereby driving the lever mechanism 50 to operate.

Figure 16:
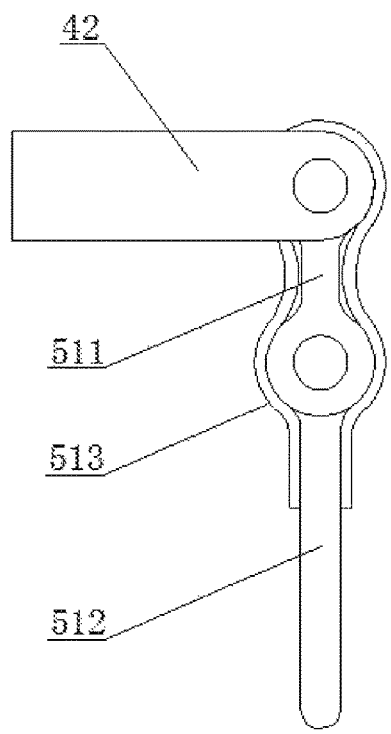
FIG. 16 is a schematic structural view of a lever mechanism in an embodiment 5 of a grease pumping device.

An embodiment 5 of the lever mechanism 50 is shown in FIG. 16. In this embodiment, the lever mechanism 50 includes a swing arm 511, a rotation arm 512, and a spring clip 513. A first end of the swing arm 511 is hinged to the valve core 42. A middle part of the swing arm 511 is rotatably connected to the valve body 41 of the two-position reversing valve 40; specifically, they can be connected by a pin. A second end of the swing arm 511 is hinged to a first end of the rotation arm 512. Specifically, a through hole may be disposed at the second end of the swing arm 511 and the first end of the rotation arm 512, and the two are connected by a pin. The swing arm 511 and the rotation arm 512 are sandwiched in the spring clip 513.

After assembling as above, under the effect of external force, the swing arm 511 can rotate around its middle part, and the swing arm 511 can pull the valve core 42 to move during the rotation process, thereby changing the position of the valve core 42. When the rotation of the swing arm 511 is hindered, the rotation arm 512 hinged thereto can still rotate around the second end of the swing arm 511, that is, the first end of the rotation arm 512, under the effect of external force.

In order to prevent the valve core 42 from moving excessively, the corresponding position on the valve body 41 is also provided with the position-limiting member 43 that limits the position of the valve core 42. When the valve core 42 is moved to the position, the swing arm 511 cannot continue to rotate due to the value core 42 being stopped by the position-limiting member 43, so that the valve core 42 can be maintained in the corresponding valve position.

The output rotating shaft 311 of the driving mechanism is provided with a toggle member. When the toggle member is driven to rotate by the motor 31, the toggle member can push a second end of the rotation arm 512 to drive the lever mechanism 50 to move.

Five specific embodiments of the lever mechanisms 50 have been described above. It can be understood that on the basis of the above embodiments, the lever mechanism 50 can also be modified in various ways. On basis of the above embodiments, the grease pumping device may be provided with multiple plunger pairs 20 to meet the needs of different lubricating grease pumping devices with different delivery amount. When there are two or more of the plunger pairs 20, the grease drain ports of the plunger pairs 20 are in connection with one another. At this time, the grease inlet of the two-position reversing valve 40 only needs to be in communication with the grease drain ports of any one of the plunger pairs 20.

In addition, a relief valve communicating with the grease tank may be provided at the grease drain port of the plunger pair 20, and a safety valve may also be provided.

On basis of the above embodiments, it is possible to dispose only one grease outlet of the two-position reversing valve 40; alternatively, two grease outlets may be provided.

Figure 17:
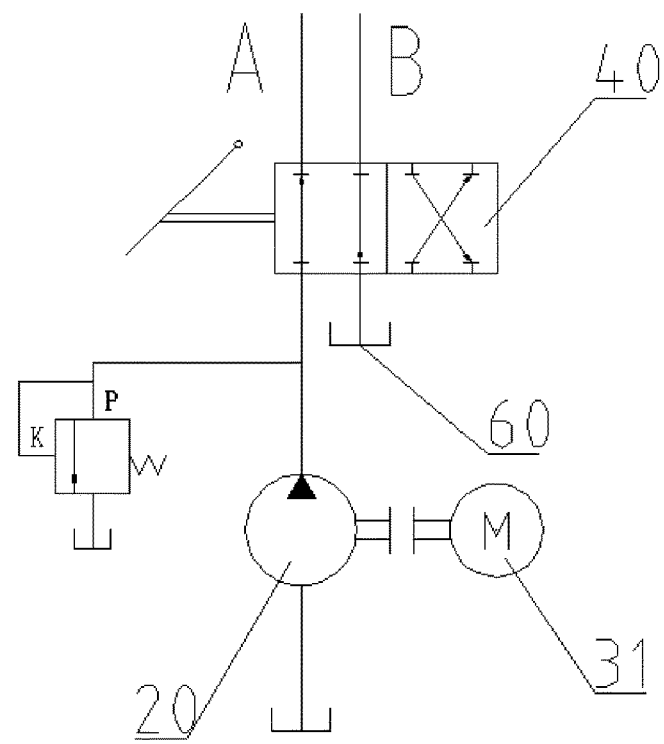
FIG. 17 illustrates a schematic view showing the principle of a grease pumping device having a first two-position reversing valve.

With reference to FIG. 17, FIG. 17 illustrates a schematic view showing the principle of a grease pumping device having a first two-position reversing valve.

In this solution, the two-position reversing valve 40 is provided with two grease outlets A and B. At this time, the two-position reversing valve 40 is a two-position four-way valve. Specifically, the configuration may be that, when the two-position reversing valve 40 is located at the first valve position, its grease inlet is only in communication with the grease outlet A, and the grease outlet B is only in communication with the grease return port. When the two-position reversing valve 40 is located at the second valve position, its grease inlet is only in communication with the grease outlet B, and the grease outlet A is only in communication with the grease return port. In this way, two external pipelines can be provided, which are respectively in communication with the grease outlets A and B. During operation, the two external pipelines are alternately pressurized and unloaded through the reversing valve switched between different valve positions. In a specific solution, a two-line dispenser in communication with the grease outlets A and B may be provided, and the lubricating grease is distributed to the portion to be lubricated through the two-line dispenser.

Figure 18:
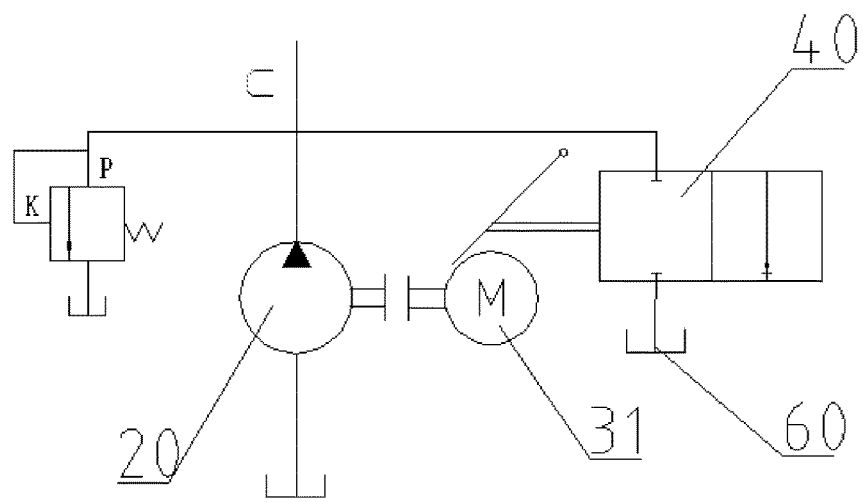
FIG. 18 illustrates a schematic view showing the principle of a grease pumping device having a second two-position reversing valve.

With reference to FIG. 18, FIG. 18 illustrates a schematic view showing the principle of a grease pumping device having a second two-position reversing valve.

In this solution, the two-position reversing valve 40 is provided with only one grease outlet C. Under the circumstances, the two-position reversing valve 40 is a two-position three-way valve. When the two-position reversing valve 40 is located at the first valve position, its grease inlet is only in communication with the grease outlet C. When the two-position reversing valve 40 is located at the second valve position, its grease return port, grease inlet and grease outlet C are in connection with each other. In this way, only one external pipeline is provided, which is in communication with the grease outlet C. During operation, this external pipeline serves as both a pipeline for pumping lubricating grease and a pipeline for returning excessive grease. In a specific solution, a single-line dispenser in communication with the grease outlet C may be provided, and the lubricating grease is distributed to the portion to be lubricated through the single-line dispenser.

Figure 19:
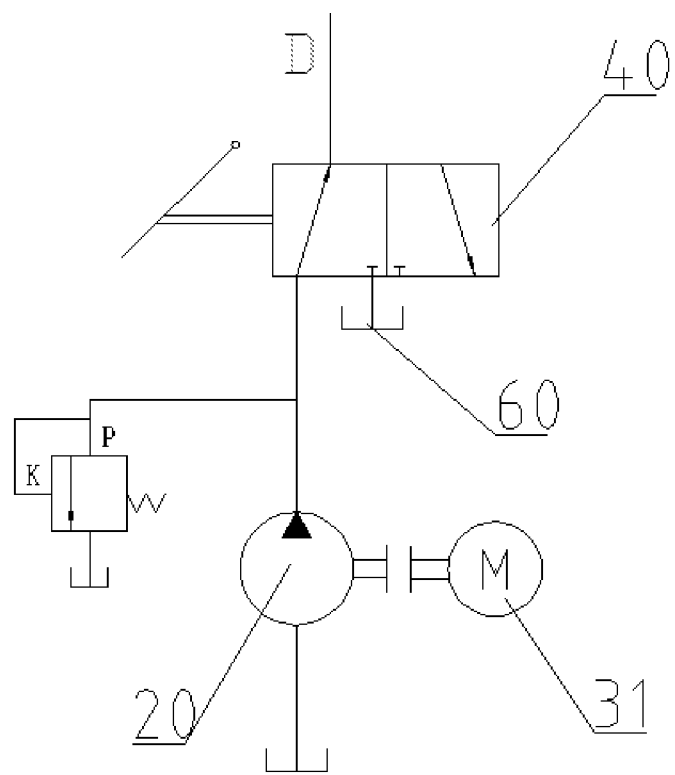
FIG. 19 illustrates a schematic view showing the principle of a grease pumping device having a third two-position reversing valve.

With reference to FIG. 19, FIG. 19 illustrates a schematic view showing the principle of a grease pumping device having a third two-position reversing valve.

In this solution, the two-position reversing valve 40 is provided with only one grease outlet D. At this time, the two-position reversing valve 40 is a two-position three-way valve. When the two-position reversing valve 40 is located at the first valve position, its grease inlet is only in communication with the grease outlet D, and when the two-position reversing valve 40 is located at the second valve position, its grease return port is only in communication with the grease outlet D. In this way, only one external pipeline is provided, which is in communication with the grease outlet D. During operation, the external pipeline serves as both a pipeline for pumping lubricating grease and a pipeline for returning excessive grease. In a specific solution, a single-line dispenser communicating with the grease outlet D may be provided, and the lubricating grease is distributed to the portion to be lubricated through the single-line dispenser.

In addition, in the specific configuration, four channels can be disposed on the two-position reversing valve 40, that is, the two-position reversing valve 40 has one grease inlet, one grease return port and two grease outlets. In application, one of the grease outlets can be blocked according to the actual situation, such that the two-position reversing valve 40 operates as a two-position three-way valve, or none of the four channels is blocked such that the two-position reversing valve 40 operates as a two-position four-way valve. In this way, the application is flexible and special design is not required for different occasions.

The two-position reversing valve 40 can be configured as a slide valve structure or a rotary valve structure. When the reversing valve is configured as a rotary valve structure, the structure of the lever mechanism needs to be adaptively changed, and the position of the rotary valve needs to be turned over by 90 degrees relative to the slide valve in the above embodiment. A corresponding rotary handle is disposed on the valve core, and the rotary handle is connected to the fulcrum of the lever mechanism, or can also be connected to the hinged position where the lever mechanism is hinged to the valve core. Or in other embodiments, the reversing valve may even be a three-position four-way valve, and the valve core has three valve positions in its moving stroke.

In other embodiments, the lever mechanism is in a combined style, and includes an elastic member formed by an elastic clip. Meanwhile, the toggle member also adopts an elastic toggle member, as long as the rigidity of the combined lever is matched with the rigidity value of the elastic toggle member, the requirement for limitation resistance transmission can be satisfied.

In other embodiments, the lever mechanism may not utilize labor-saving levers. For example, the fulcrum of the lever mechanism is disposed between the valve core and the eccentric wheel, that is, the fulcrum is disposed between the power input end, of the lever mechanism, cooperating with the transmission of the toggle member and the hinged point on the valve core.

It needs to be further explained that in the above-mentioned various embodiments, the output rotating shaft can continuously rotate in forward direction in indefinite number of circles then rotate in reverse direction in indefinite number of circles, or can rotate in forward and reverse directions in an incomplete circle as long as the toggle member can toggle the lever mechanism in the rotation stroke. The output rotating shaft can stop for a period of time after rotating in forward direction in indefinite number of circles, and rotates in reverse direction when it needs to operate. When the output rotating shaft rotates in forward and reverse directions in an incomplete circle, it can stop for a period of time when rotating to an ultimate position in forward direction, and rotates in reverse direction when it needs to operate as long as the toggle member toggles the lever mechanism in reverse direction.

The grease pumping device provided by the present invention has been described in detail above. Specific examples are utilized herein to explain the principles and implementation of the present invention. The description of the above embodiments only serves to help understand the method of the present invention and its main ideas. It should be noted that for those of ordinary skill in the art, without departing from the principles of the present invention, several improvements and modifications can be made to the present invention. Under the circumstances that no creative effort is involved, these improvements and modifications also fall within the scope of the claims of the present invention.

What is claimed is:

1. A grease pumping device, comprising a pump body, a driving mechanism with an output rotating shaft, and at least one plunger pair driven by the driving mechanism, the grease pumping device further comprising a reversing valve and a lever mechanism provided in the pump body, wherein a switching action between each valve position of a valve core of the reversing valve is driven by a swinging action of the lever mechanism, the output rotating shaft drives a toggle member rotating therewith, and when the output rotating shaft rotates reciprocally in forward and reverse directions, the toggle member toggles the lever mechanism in the forward and reverse directions, such that the lever mechanism swings reciprocally, thereby changing the valve position of the reversing valve, at least one of the lever mechanism and the toggle member is an elastic structure, when the output rotating shaft rotates in the forward direction or the reverse direction, the toggle member contacts the lever mechanism and drives the valve core to operate, and when the valve core is switched to a corresponding valve position, the toggle member and the lever mechanism slide relatively by elastic deformation of the elastic structure.

2. The grease pumping device according to claim 1, wherein the reversing valve is a slide valve structure.

3. The grease pumping device according to claim 2, wherein the reversing valve is a two-position reversing valve.

4. The grease pumping device according to claim 3, wherein the two-position reversing valve is a four-way reversing valve, when at a first valve position, a first grease outlet of the two-position reversing valve communicates with a grease inlet of the two-position reversing valve, and a second grease outlet of the two-position reversing valve communicates with a grease return port of the two-position reversing valve; when at a second valve position, the first grease outlet of the two-position reversing valve communicates with the grease return port of the two-position reversing valve, and the second grease outlet communicates with the grease inlet of the two-position reversing valve.

5. The grease pumping device according to claim 4, wherein the lever mechanism is the elastic structure and comprises a combined lever, the combined lever comprises a first lever body and a second lever body, one end of the first lever body is hinged with the valve body and a hinged point forms a fulcrum, the other end of the first lever body is hinged with the second lever body, the second lever body cooperates with the toggle member, the lever mechanism further comprises an elastic member located at a hinged location of the first and second lever bodies to keep the two lever bodies in a collinear state, after the second lever body is shifted from the toggle member, the elastic member makes the second lever body return to a position where the second lever body is collinear with the first lever body.

6. The grease pumping device according to claim 3, wherein the two-position reversing valve is a three-way reversing valve, when at the first valve position, the grease inlet of the two-position reversing valve is in communication with the grease outlet of the two-position reversing valve; when at the second valve position, the grease inlet, the grease outlet and the grease return port of the two-position reversing valve are in communication with each other.

7. The grease pumping device according to claim 3, wherein the two-position reversing valve is a two-way switching valve.

8. The grease pumping device according to claim 3, wherein the lever mechanism is the elastic structure and comprises a combined lever, the combined lever comprises a first lever body and a second lever body, one end of the first lever body is hinged with the valve body and a hinged point forms a fulcrum, the other end of the first lever body is hinged with the second lever body, the second lever body cooperates with the toggle member, the lever mechanism further comprises an elastic member located at a hinged location of the first and second lever bodies to keep the two lever bodies in a collinear state, after the second lever body is shifted from the toggle member, the elastic member makes the second lever body return to a position where the second lever body is collinear with the first lever body.

9. The grease pumping device according to claim 2, wherein the lever mechanism is the elastic structure and comprises a combined lever, the combined lever comprises a first lever body and a second lever body, one end of the first lever body is hinged with the valve body and a hinged point forms a fulcrum, the other end of the first lever body is hinged with the second lever body, the second lever body cooperates with the toggle member, the lever mechanism further comprises an elastic member located at a hinged location of the first and second lever bodies to keep the two lever bodies in a collinear state, after the second lever body is shifted from the toggle member, the elastic member makes the second lever body return to a position where the second lever body is collinear with the first lever body.

10. The grease pumping device according to claim 2, wherein the lever mechanism is the elastic structure, and comprises a rocker arm hinged on the valve body and an elastic piece provided on one end of the rocker arm, and a hinged point of the rocker arm and the valve body constitutes a fulcrum, the valve core is hinged on the rocker arm, and the elastic piece is toggled by the toggle member when the output rotating shaft rotates.

11. The grease pumping device according to claim 1, wherein the lever mechanism is the elastic structure and comprises a combined lever, the combined lever comprises a first lever body and a second lever body, one end of the first lever body is hinged with the valve body and a hinged point forms a fulcrum, the other end of the first lever body is hinged with the second lever body, the second lever body cooperates with the toggle member, the lever mechanism further comprises an elastic member located at a hinged location of the first and second lever bodies to keep the two lever bodies in a collinear state, after the second lever body is shifted from the toggle member, the elastic member makes the second lever body return to a position where the second lever body is collinear with the first lever body.

12. The grease pumping device according to claim 7, wherein the elastic member is a U-shaped spring clip, a clamping opening of the U-shaped spring clip faces the second lever body from the fulcrum, and a clamping length of the U-shaped spring clip is greater than a length of the first lever body and smaller than a sum of the length of the first lever body and a length of the second lever body.

13. The grease pumping device according to claim 1, wherein the lever mechanism is the elastic structure, and comprises a rocker arm hinged on the valve body and an elastic piece provided on one end of the rocker arm, and a hinged point of the rocker arm and the valve body constitutes a fulcrum, the valve core is hinged on the rocker arm, and the elastic piece is toggled by the toggle member when the output rotating shaft rotates.

14. The grease pumping device according to claim 13, wherein a portion where the toggle member and the lever mechanism contact is provided with a roller.

15. The grease pumping device according to claim 1, wherein the toggle member is the elastic structure.

16. The grease pumping device according to claim 15, wherein the lever mechanism includes a swing arm rotatable around a first end thereof, when the output rotating shaft rotates, a second end of the swing arm is pushed by the toggle member to drive the valve core to move, and a portion where the second end of the swing arm and the toggle member contact is provided with a roller.

17. The grease pumping device according to claim 1, wherein at least two of the plunger pairs are in the pump body, and grease drain ports of the plunger pairs are in communication with each other.

18. The grease pumping device according to claim 1, wherein at least one of the lever mechanism and the toggle member is provided with a rolling member that is independently rotatable, and the rolling member is configured to reduce friction and resistance when the lever mechanism and the toggle member slide relatively.

19. The grease pumping device according to claim 18, wherein one of the lever mechanism and the toggle member is the elastic structure, and the rolling member is disposed on another one of the lever mechanism and the toggle member.

20. The grease pumping device according to claim 19, wherein the rolling member is a miniature bearing or ball or roller.

\* \* \* \* \*